United States Patent [19]

Gambuti et al.

[11] Patent Number: 4,701,627
[45] Date of Patent: Oct. 20, 1987

[54] MOBILE DISPLAY APPARATUS

[76] Inventors: Patrick F. Gambuti, 32 Thoreau Dr., Plainsboro, N.J. 08537; Louis I. Martino, 2 Mansfield St., Margate, N.J. 08402

[21] Appl. No.: 842,911

[22] Filed: Mar. 24, 1986

[51] Int. Cl.⁴ ............................................ B60R 13/00
[52] U.S. Cl. ..................................................... 296/21
[58] Field of Search ............... 296/21, 24 R; 410/87; 248/561, 565, 603, 638

[56] References Cited

U.S. PATENT DOCUMENTS

| | | | |
|---|---|---|---|
| 1,813,542 | 7/1931 | Omens | 296/21 |
| 3,921,320 | 11/1975 | McWilliams | 40/493 |
| 4,110,792 | 8/1978 | Long | 358/240 |
| 4,176,483 | 12/1979 | Bailey | 40/467 |
| 4,181,347 | 1/1980 | Clark | 296/24 R |
| 4,438,580 | 5/1984 | Yamaji | 40/590 |
| 4,446,643 | 5/1984 | Fujita | 40/590 |
| 4,495,719 | 1/1985 | Futatsuishi et al. | 40/590 |

FOREIGN PATENT DOCUMENTS 7907204 3/1981 Netherlands ..................... 296/163

Primary Examiner—Robert R. Song
Attorney, Agent, or Firm—Abraham Wilson; Robert A. Green

[57] ABSTRACT

The apparatus comprises a van containing a console carrying a projection TV set, miscellaneous electronic apparatus, a speaker system and the like. The console is positioned so that the sreen of the TV set faces the rear doors of the van and the console is spring supported on the floor of the van so that the delicate TV set can withstand the shock of travel without requiring adjustments before use.

Apparatus is provided to shield the TV screen from ambient light.

13 Claims, 11 Drawing Figures

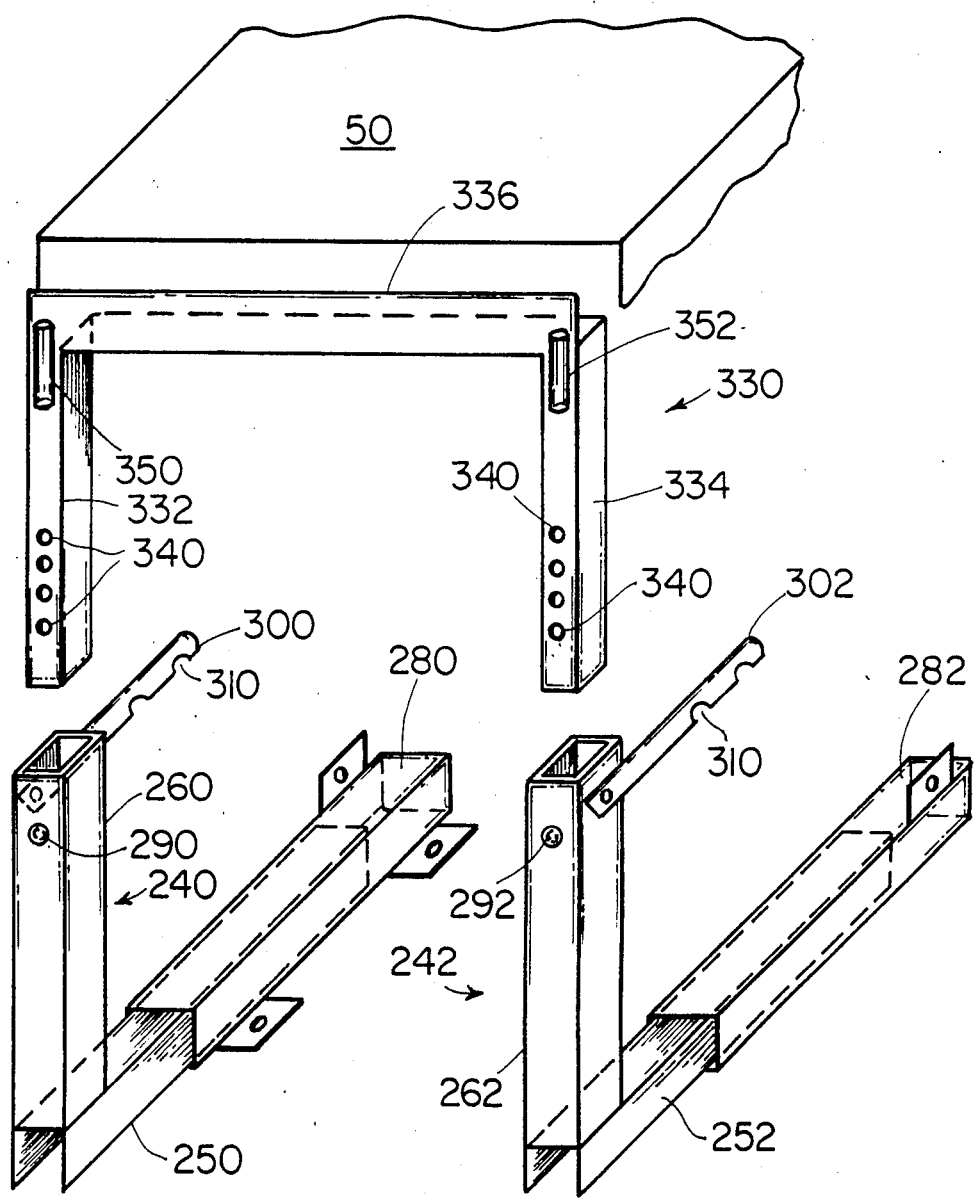

MOBILE DISPLAY APPARATUS

Mobile apparatus for use as an advertising medium has been known for some time and some forms of such apparatus use trailers on which advertising or other displays are provided. However, none of this known apparatus includes or is designed to carry delicate electronic and video equipment to be used in the display process. The present invention utilizes such delicate electronic equipment and this presents special problems in packaging, mounting and support of the apparatus to permit it to be moved about. Mobile apparatus of this type must be able to carry the equipment contained therein over all kinds of roads and it must arrive at its destination with the equipment ready for use without requiring adjustment of an extensive nature. The present invention provides such mobile apparatus.

DESCRIPTION OF THE DRAWINGS

FIG. 8 is a perspective view of apparatus used in conjunction with the console of FIG. 2;

DESCRIPTION OF THE INVENTION

Figure 1:
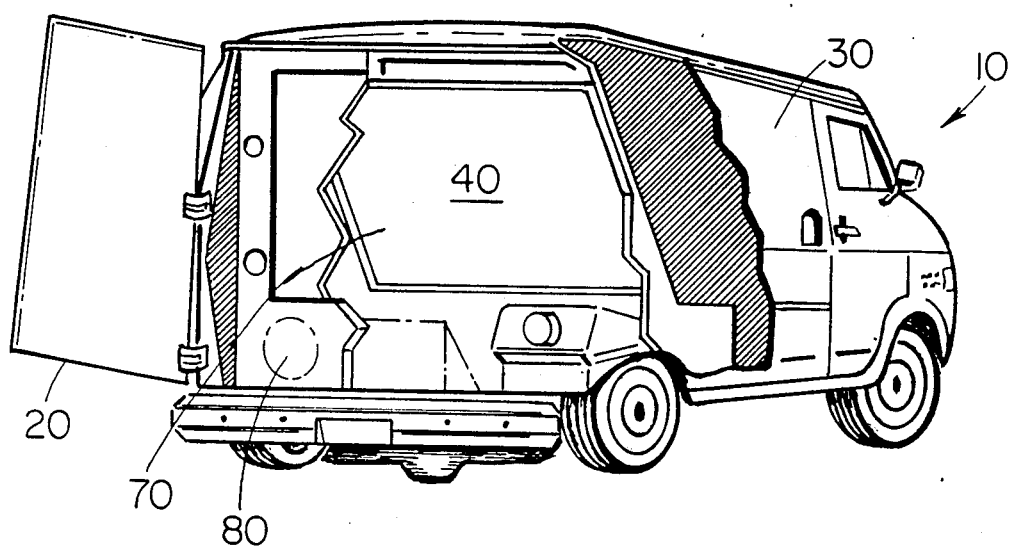
FIG. 1 is a perspective view of a vehicle of the type used in practising the invention.
Figure 2:
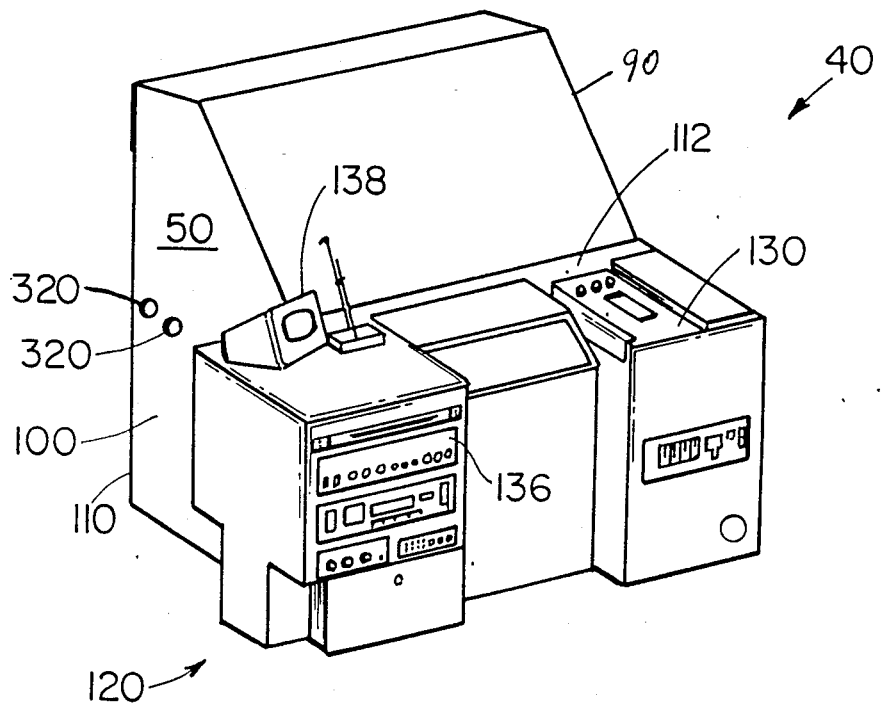
FIG. 2 is a perspective view, from the rear, of a console carried in the vehicle shown in FIG. 1.

The apparatus of the invention is embodied in a vehicle such as a van 10 having rear doors 20 and a side door 30 and is of generally conventional van construction. It is understood that the van has the usual spring and shock absorbing apparatus associated with its frame. Mounted within the van is a console 40 carrying a variety of electronic equipment and it is constructed of wood or the like.

The console includes a front portion 50 in which a specially modified large-screen projection TV set 60 is mounted with its viewing screen 70 facing the rear doors of the van. The front portion of the console also carries a plurality of speakers 80 to transmit sound to an audience and these face the rear doors of the van.

The console 40 includes side walls 90 and 100 and front and rear walls 110 and 112, respectively, with the TV set 60 and speakers 80 suitably secured to the front wall. Other walls are provided as required to support the various pieces of electronic equipment.

Behind the front portion of the console frame is a rear console portion 120 which houses various pieces of electronic equipment such as a TV tape recorder 130 and associated electronic apparatus for operating the same, a stereo audio receiver 136, a monitor 138, TV camera equipment, and the like. This portion of the console accommodates the operator of the system and is positioned adjacent to the side door 30 of the van so that the operator can enter through this door and reach the rear of the console.

Figure 4:
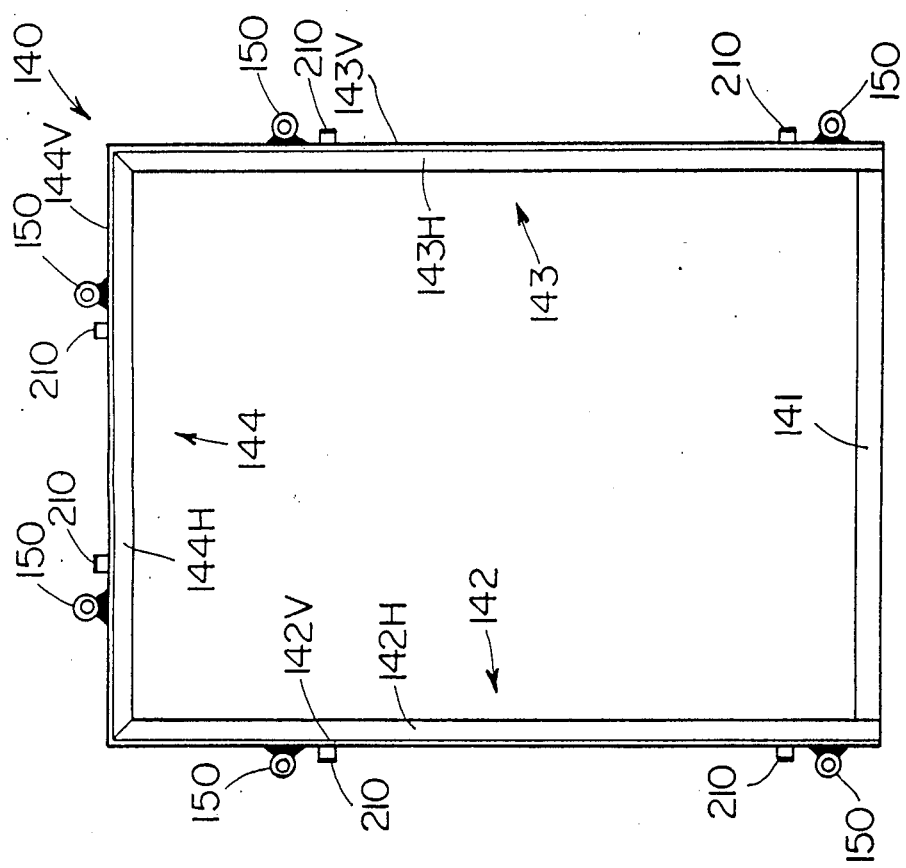
FIG. 4 is a plan view of a frame for supporting the console of FIG. 2.
Figure 5:
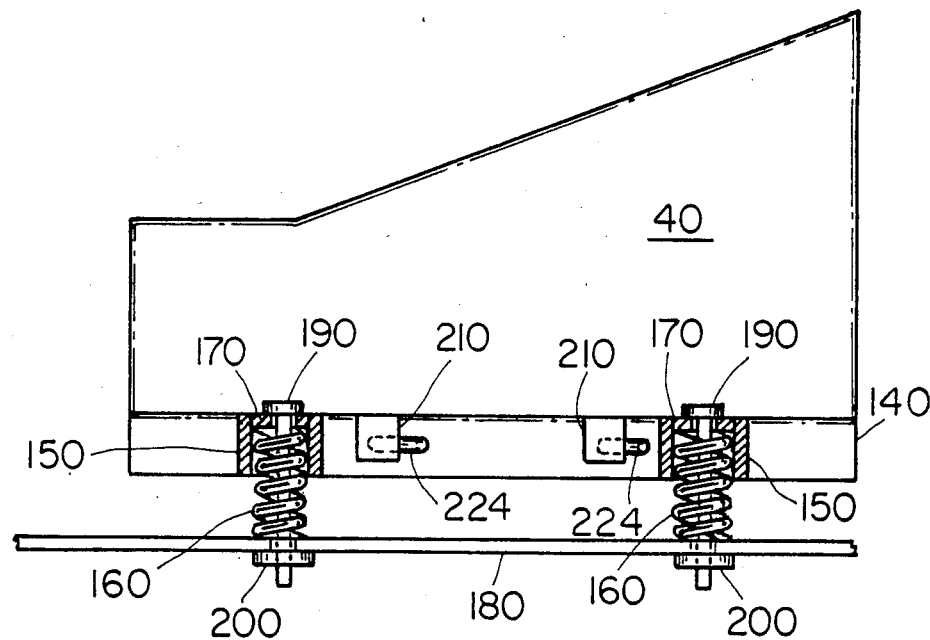
FIG. 5 is a side elevational view of the console of FIG. 2 and its support means.

Referring to FIGS. 4, 5, the apparatus of the invention includes a resilient or flexible mounting means for the console 40 and its equipment. The resilient mounting means includes a rectangular metal frame 140 which is made up of a flat front bar 141, left and right side bars 142 and 143, and a rear bar 144. All of the bars, except front bar 141 are L-shaped bars and each includes an outer vertical member 142V, 143V and 144V and a horizontal member 142H, 143H and 144H.

At least six hollow metal tubes or cylinders 150 are secured by welding or the like to the vertical members of the side bars 142 and 143 and the rear bar 144. Two tubes 150 are disposed suitably spaced apart on each of the side and rear bars of the frame.

The tubes or cylinders 150 are adapted to receive strong, helical springs 160 and each cylinder includes an apertured top cap 170 which holds a spring in place in its cylinder. The cylinders are disposed vertically. The cylinders are the same length as the vertical bar members to which they are secured by the springs are longer than the cylinders and they extend downwardly below the lower ends of the cylinders and the bar members when they are in place in the cylinders as seen in FIG. 5.

The frame 140, with springs 160 in place in the cylinders 150, is placed on the floor 180 of the van 10 with the front bar 141 facing and about ten inches from the rear doors of the van and it is bolted in place by means of bolts inserted into the apertured caps 170 of the cylinders 150 and extending through the springs 160 and through holes in the floor of the van. Nuts 200 are threaded on the lower ends of the bolts to lock the frame in place. As illustrated in FIG. 5, the frame 140 is secured to the floor but it rests on the springs 160.

The frame 140 also carries a plurality of L-shaped brackets 210 welded to the left and right side bars 142 and 143 to lock the console in place as described below.

After all of the desired electronic equipment is secured to the console 40, the console is mounted in the van by being slid onto the frame 140 which has been bolted to the van floor and is dimensioned to support the lower ends of the side walls 90 and 100 of the console and other portions thereof on the horizontal bar members 142H, 143H and 144H.

Thus, it can be seen that the console 40 and its electronic equipment are resiliently supported on the springs 160 which bear against the floor of the van.

Figure 6:
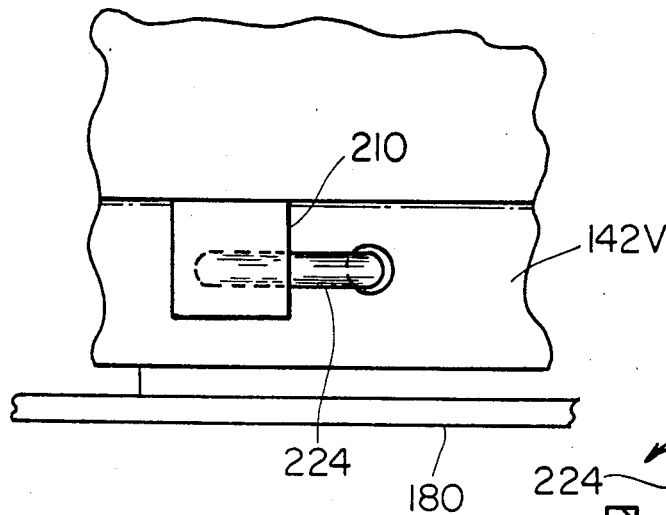
FIG. 6 is a side elevational view of a portion of the apparatus shown in FIG. 5.
Figure 7:
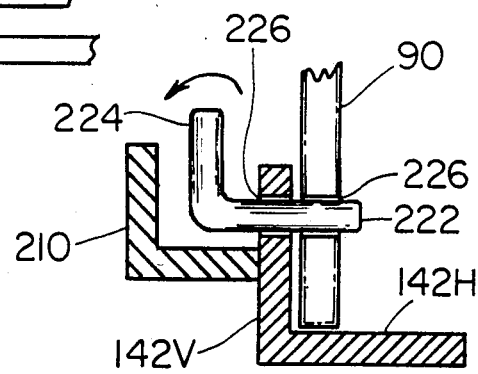
FIG. 7 is a side view, partly in section, of the apparatus of FIG. 6.

The console 40 is seated on the frame 140 and is locked in place on the frame by means of L-shaped pins 200 having their horizontal legs 222 inserted into holes 226 in the side bars 142 and 143 of the frame 140 and the console frame and rotatable to permit their vertical legs 224 to seat in the L-shaped brackets 210 secured to the frame. This is illustrated in FIGS. 6 and 7.

Figure 3:
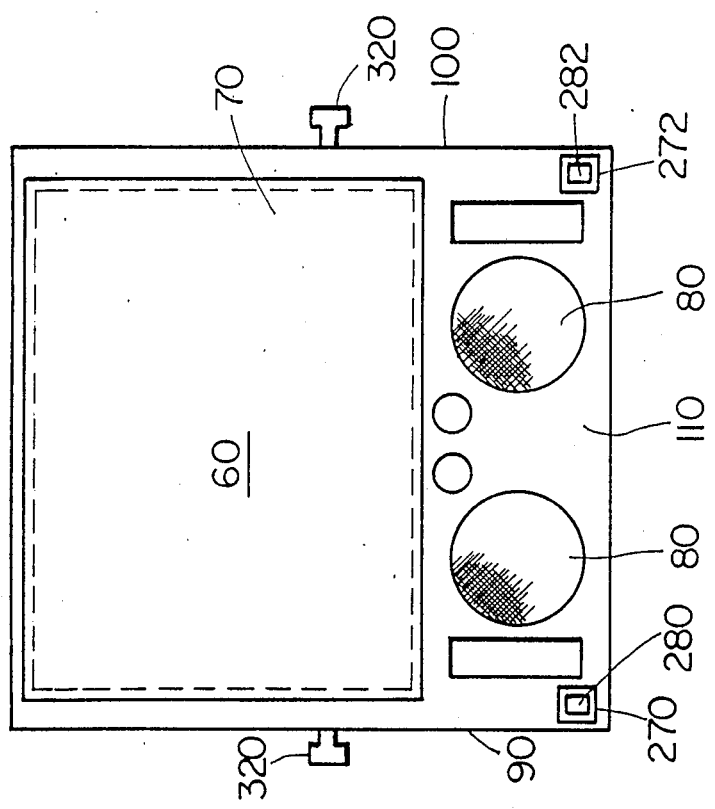
FIG. 3 is a front elevational view of the console of FIG. 2.
Figure 10:
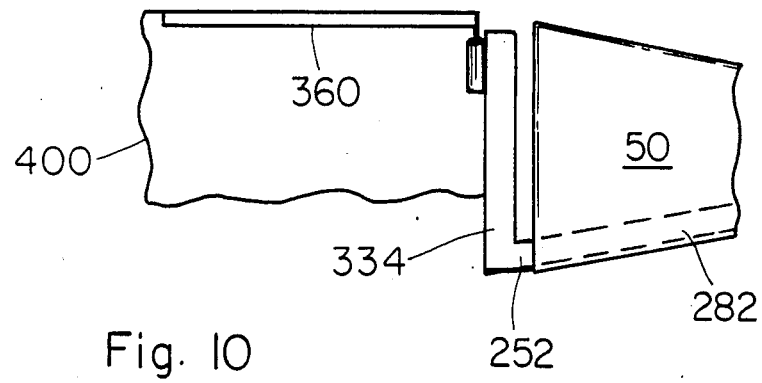
FIG. 10 is a side elevational view of the console of FIG. 2 and the apparatus of FIGS. 8 and 9 coupled thereto.
Figure 9:
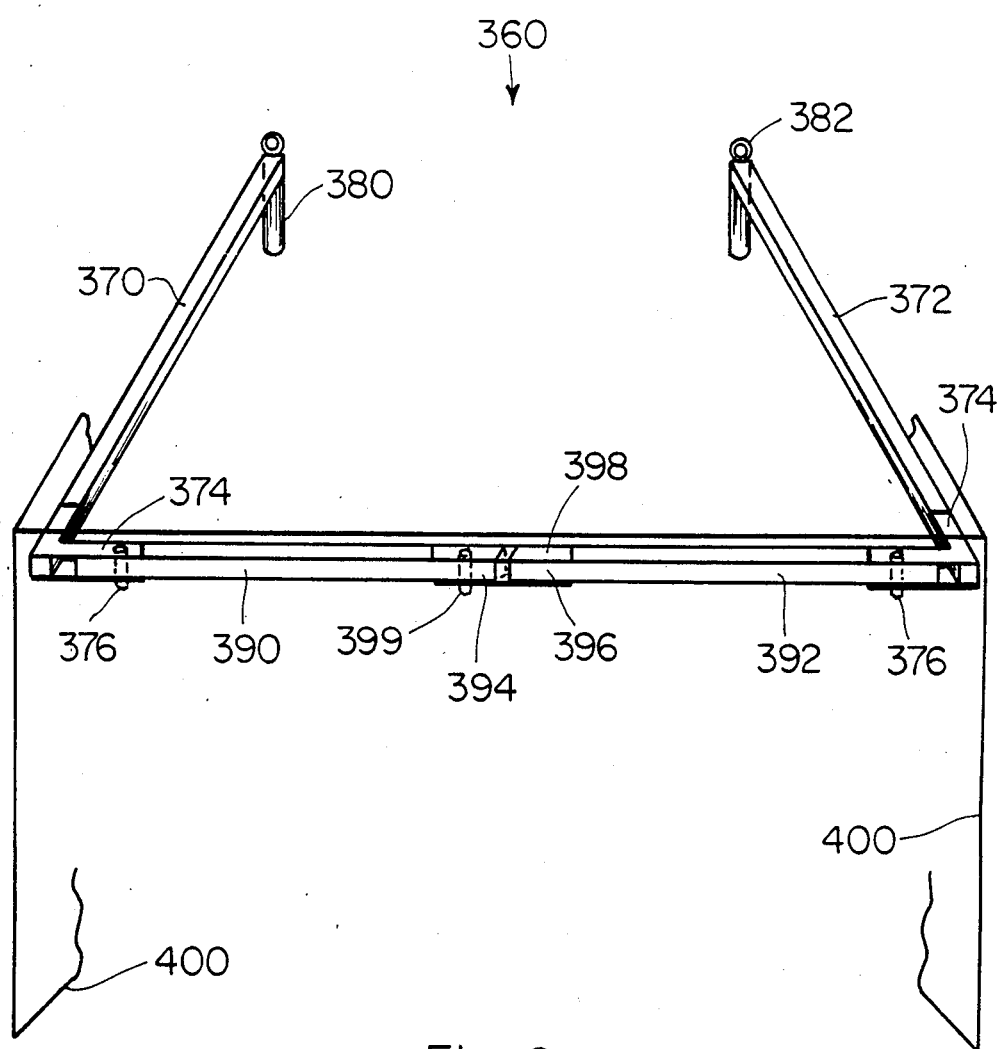
FIG. 9 is a perspective view of other apparatus used with the apparatus of FIG. 8.

Referring to FIGS. 8 to 10, the apparatus of the invention is also provided with means for supporting a canopy over a region in front of the console to improve the viewability of the video screen to the audience by shielding ambient light therefrom. This means includes two L-shaped metal brackets 240, 242 each of which includes a horizontal bar 250, 252 and a vertical bar 260, 262 both of which have a rectangular or square cross section for convenience. The horizontal bars 250, 252 of the L-shaped brackets are adapted to be inserted into openings 270, 272 at the lower left and right hand corners of the front wall of the console (FIG. 3) and to enter guide tubes 280, 282 secured to the floor of the console. Each L-shaped bracket is thus slidably coupled to the console frame.

The vertical bar of each L-shaped bracket is hollow and is provided, on its front wall, preferably, with a spring-biased locking pin 290, 292. A pivotable locking bar 300, 302 is pivotably secured to the outside wall of each vertical bar 260, 262 and is provided with cotout notches 310 which are adapted to engage pins 320 on the side walls of the console to hold the L-shaped brackets 240, 242 firmly in place.

The vertical legs 260, 262 of the L-shaped brackets 240, 242 are adapted to receive another member comprising a U-shaped metal bracket 330 including two vertical legs 332 and 334 and a cross bar 336. The vertical legs 332, 334 are adapted to be inserted into the vertical bars 260, 262 of the L-shaped brackets 240, 242 and they are provided with a series of holes 340 along their lengths which are adapted to receive the springbiased locking pins 290, 292 and thus the U-shaped bracket can be adjustably mounted and secured to the vertical bars of the L-shaped bracket. At their upper ends, adjacent to the cross bar 336, each of the vertical legs 332 and 334 of the U-shaped bracket carries a hollow tube 350, 352 secured to the outer or front walls of the legs 332, 334 and oriented vertically.

The canopy structure further includes a member 360 adapted to be coupled to the U-shaped bracket 330 and this member 360 which is also of metal, includes two elongated horizontal bars or rods 370, 372 each of which has a short vertical post 380, 382 at one end. These posts 380, 382 are adapted to be inserted into the tubes 350 and 352 of U-shaped bracket 330. At their other ends, the bars 370, 372 are pivotably coupled to second bars or rods 390, 392 by means of brackets 374 and pins 376. The bars 390, 392 have their adjacent ends 394, 396 pivotably coupled together by means of a bracket 398 and pin 399 which may be removable. If desired, the end 396 of bar 392 can be inserted into the adjacent end 394 of bar 390. With the linkages and parts described, the various bars can be pivoted with respect to each other so that they form a rectangular frame which, when coupled to the U-shaped bracket 330 can extend outwardly away from and above the TV viewing screen and when this rectangular frame is covered with a black canvas 400 (shown only schematically), it shields the TV screen from the ambient light and improves viewability for the audience.

The shielding canvas is arranged so that it can be buttoned to the console at the sides thereof and it can be stretched to fill the space between the front of the console and the door frame of the van.

Figure 11:
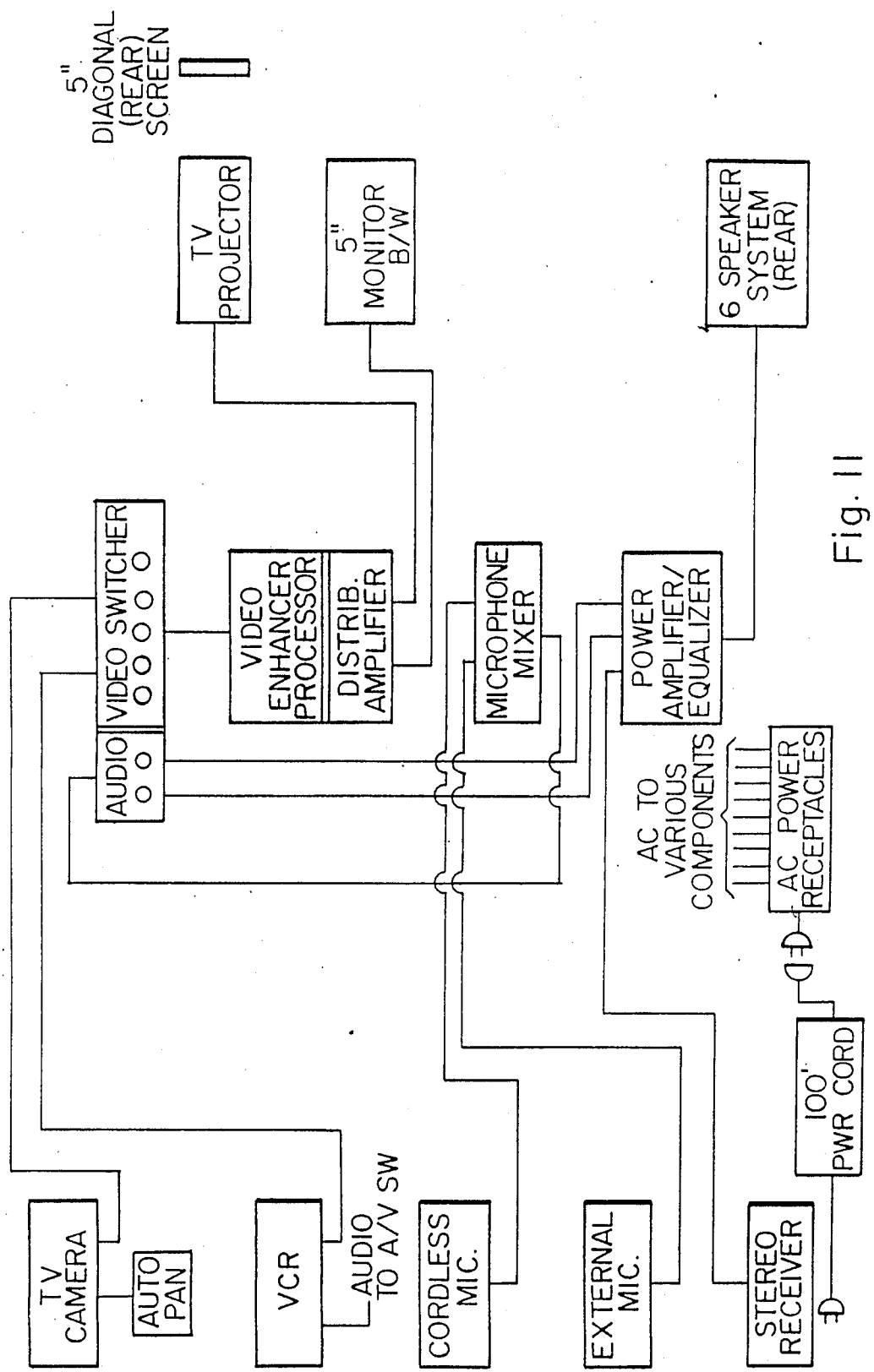
FIG. 11 is a schematic representation of some electronic apparatus in the console of FIG. 2 and the electrical connections thereto.

The schematic diagram of FIG. 11 shows typical equipment which can be mounted on the console and the manner in which the equipment is electrically connected.

The van 10 thus described is used by being driven to a location, for example a public swimming pool or playground or the like at which large numbers of people especially young people might be congregated. At this location, the rear doors 20 are opened to expose the display screen 70 to the audience and the operator turns on the desired advertising or entertainment program for display on the TV screen. The sound of the program is readily transmitted to the crowd through the specially designed speaker system. It should be noted, incidentally, that the speaker system is a high-powered system which causes the console to reverberate and the resilient spring-mounting of the console protects the electronic equipment against this shock.

As part of the program, the operator can use the video camera to photograph the audience and project the picture onto the screen.

What is claimed is:

1. Mobile display apparatus comprising
a van having a van body enclosing its interior storage space and rear doors and a side door,
said van having a horizontal interior floor,
said van having shock absorbing and spring suspensions associated with its frame,
a console carrying electronic apparatus for displaying pictures and generating sound, said console being disposed inside said van, and
support means resiliently supporting said console adjacent to but spaced from the floor of the van
said support means comprising a rectangular frame made up of a front bar, a left bar, a right bar and a rear bar all of said bars having a flat, horizontal portion.

2. The apparatus defined in claim 1 wherein said support means carries a plurality of springs which engage the floor of the van and support the console on the floor of the van.

3. The apparatus defined in claim 1 wherein said support means comprises a frame on which said console is supported, and a plurality of springs coupled to said frame, said springs engaging the floor of the van and thereby supporting said console resiliently.

4. The apparatus defined in claim 1 wherein said frame is oriented with said front br disposed facing said rear doors of said van.

5. The apparatus defined in claim 1 and including a plurality of cylindrical members secured to said left and right bars and said rear bar, said cylindrical members containing springs and having apertured top caps which contain said springs in said cylindrical members.

6. The apparatus defined in claim 5 wherein said springs extend downwardly and terminate below said frame so that they bear against said floor of said van when said frame is secured to said floor of said van.

7. Mobile display apparatus comprising
a van having a van body defining an interior space and having rear doors and a side door,
a console mounted inside said van and including a display screen disposed adjacent to said rear doors, said console having a front wall,
means resiliently mounting said console within said van, on the floor of said van,
a frame disposed adjacent to said console for shielding said screen from ambient light,
said frame comprising a first bracket having horizontal legs adapted to be coupled to tubes secured to the floor of said van within said console and having vertical legs disposed adjacent to the front wall of said console, and
a horizontal frame secured to said vertical legs and extending forwardly from said console, and
means mounted on said horizontal frame for shielding said console visually from ambient light.

8. The display apparatus defined in claim 7 wherein said frame comprises a first bracket having horizontal legs positioned adjacent to the bottom of said console and insertable through said console into tubes supported on the floor of said van, said first bracket also having vertical legs extending vertically from said horizontal legs in front of said console and adjacent to the front wall of said console, a tube secured to the upper end of each of said vertical legs, a frame coupled to said tubes and extending forwardly from said console, said frame being disposed horizontally, and means supported on said frame shielding said display screen from ambient light.

9. The apparatus defined in claim 8 wherein said frame is made up of two side bars having one end of each inserted in one of said tubes and the other end of each pivotably coupled to an auxiliary bar, there being two auxiliary bars pivotably coupled to said side bars and to each other so that said frame is collapsible, said side bars comprising the sides of said frame and said auxiliary bars comprising the front of said frame.

10. The apparatus defined in claim 1 wherein all of said bars, except said front bar, are L-shaped in cross section and include a vertical bar member and a horizontal bar member.

11. Mobile display apparatus comprising a van having a van body enclosing its interior storage space and a door providing access to the interior of the van said van having a horizontal interior floor, said van having shock absorbing and spring suspensions associated with its frame, a console carrying electronic apparatus for displaying pictures and generating sound, said console being disposed inside said van, and support means resiliently supporting said console adjacent to but spaced from the floor of the van, said support means comprising a rectangular frame made up of a front bar, a left bar, a right bar and a rear bar all of said bars having a flat, horizontal portion.

12. Mobile display apparatus comprising a van having a van body enclosing its interior storage space and a door providing access to the interior of the van said van having a horizontal interior floor, said van having shock absorbing and spring suspensions associated with its frame, a console carrying electronic apparatus for displaying pictures and generating sound, said console being disposed inside said van, and viewable through said door of said van, and support means resiliently supporting said console adjacent to but spaced from the floor of the van, said support means comprising a rectangular frame made up of a front bar, a left bar, a right bar and a rear bar all of said bars having a flat, horizontal portion.

13. The apparatus defined in claim 10 and including at least one L-shaped bracket secured to said left bar and said right bar of said frame, and a rotatable L-shaped pin coupled to said console adjacent to each of said L-shaped brackets and adapted to be rotated into engagement with the bracket to thereby secure said console in place on said frame.

* * * * *